(12) United States Patent
Wu et al.

(10) Patent No.: US 7,853,466 B2
(45) Date of Patent: Dec. 14, 2010

(54) SUPPLY CHAIN FACILITY PERFORMANCE ANALYZER

(75) Inventors: Peiling Wu, Sterling Heights, MI (US); Shang-Tae Yee, Troy, MI (US); Devadatta M. Kulkarni, Rochester Hills, MI (US); Jeffrey D. Tew, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1132 days.

(21) Appl. No.: 11/530,039

(22) Filed: Sep. 8, 2006

(65) Prior Publication Data

US 2008/0065436 A1 Mar. 13, 2008

(51) Int. Cl.
G06F 9/44 (2006.01)
(52) U.S. Cl. ............... 705/7; 705/8; 705/9; 705/10; 705/11; 705/22; 705/23; 705/24; 705/25; 705/28; 700/107; 715/855
(58) Field of Classification Search ............... 705/7–11, 705/22–26; 700/107; 715/885
See application file for complete search history.

(56) References Cited

U.S. PATENT DOCUMENTS

| | | | |
|---|---|---|---|
| 5,946,662 A * | 8/1999 | Ettl et al. ................ | 705/8 |
| 6,151,582 A * | 11/2000 | Huang et al. ............. | 705/8 |
| 6,223,143 B1 * | 4/2001 | Weinstock et al. ........ | 703/17 |
| 6,336,121 B1 * | 1/2002 | Lyson et al. .............. | 1/1 |
| 6,486,899 B1 * | 11/2002 | Bush, Jr. ................. | 715/855 |
| 7,499,766 B2 * | 3/2009 | Knight et al. ............ | 700/107 |
| 2002/0052862 A1 * | 5/2002 | Scott et al. .............. | 707/1 |
| 2002/0099578 A1 * | 7/2002 | Eicher et al. ............ | 705/7 |
| 2002/0099579 A1 * | 7/2002 | Stowell et al. ........... | 705/7 |
| 2002/0099580 A1 * | 7/2002 | Eicher et al. ............ | 705/7 |
| 2002/0099598 A1 * | 7/2002 | Eicher et al. ............ | 705/11 |
| 2003/0055731 A1 * | 3/2003 | Fouraker et al. .......... | 705/22 |
| 2003/0078827 A1 * | 4/2003 | Hoffman ................. | 705/10 |
| 2003/0078846 A1 * | 4/2003 | Burk et al. .............. | 705/22 |
| 2005/0055254 A1 | 3/2005 | Schmidtberg et al. | |
| 2005/0055287 A1 | 3/2005 | Schmidtberg et al. | |
| 2005/0071207 A1 * | 3/2005 | Clark et al. ............. | 705/7 |

(Continued)

OTHER PUBLICATIONS

Beamon, Benita M. "Measuring supply chain performance" International Journal of Operations & Production Management, vol. 19 No. 3, 1999, pp. 275-292.*

(Continued)

Primary Examiner—Romain Jeanty
Assistant Examiner—Alan Miller
(74) Attorney, Agent, or Firm—Cantor Colburn LLP

(57) ABSTRACT

Methods, systems and computer program products for supporting supply chain facility performance analysis. Methods include maintaining supply chain facility configuration information for a plurality of supply chain facilities. The method also includes identifying variables that are attributed to performance of the supply chain facilities. Data corresponding to one or more of the variables for selected supply chain facilities in the plurality of supply chain facilities is collected. Performance analysis is performed for the selected supply chain facilities using the data as input. The performance analysis includes executing a data envelope analysis (DEA) based three-stage performance analysis model, executing a statistical analysis and executing a sensitivity analysis. The results of the performance analysis are output. The results include a performance ranking of the selected supply chain facilities, a prescription for performance improvement, a correlation analysis, and a sensitivity analysis.

21 Claims, 12 Drawing Sheets

U.S. PATENT DOCUMENTS

| | | |
|---|---|---|
| 2005/0159973 A1 | 7/2005 | Krause et al. |
| 2005/0209732 A1 | 9/2005 | Audimoolam et al. |
| 2006/0053063 A1* | 3/2006 | Nagar .......................... 705/26 |
| 2006/0059036 A1 | 3/2006 | Moese et al. |
| 2006/0064344 A1 | 3/2006 | Lidow |
| 2007/0143131 A1* | 6/2007 | Kasper et al. ................... 705/1 |
| 2008/0147490 A1* | 6/2008 | Najmi et al. ................... 705/10 |

OTHER PUBLICATIONS

Beamon, Benita M. "Supply chain design and analysis: Model and Methods" International Journal of Production Economics, vol. 55, 1998, pp. 281-294.* http://www.etm.pdx.edu/dea/homedea.html "A Data Envelopment Analysis (DEA) Home Page".*

MAPICS: "Creating World-Class Manufacturers, Performance Analyzer" (2003) URL: http://mapics.com/downloads/files/DSMPDSSCMANLZ.pdf Office Action mailed Apr. 28, 2010 by Deutsches Patent und Markenamt; DE File No. 10 2007 042 098.8-53, filed Sep. 5, 2007; corresponding to U.S. Appl. No. 11/530,039. Applicant (Anmelder) GM Global Technology Operations, Inc.

* cited by examiner

| Users | Task-level Goal |
|---|---|
| System Administrator (908) | • Configure Supply Chain Facility Organizations<br>• Configure Facility Units<br>• Configure Input/Output Variables<br>• Configure Other Roles<br>• Configure Other Users<br>• Master Data Collection – Batch Upload, Manual Data Entry<br>• Create New Projects<br>• Open Existing Projects<br>• Evaluate Efficiency<br>• Perform Sensitivity and Correlation Analysis<br>• View Reports |
| Evaluator (910) | • Create New Projects<br>• Open Existing Projects<br>• Evaluate Efficiency<br>• Perform Sensitivity and Correlation Analysis<br>• View Reports |
| Decision Maker (912) | • Create New Projects<br>• Open Existing Projects<br>• Evaluate Efficiency<br>• Perform Sensitivity and Correlation Analysis<br>• View Reports<br>• Make Decisions |

FIG. 9

1102
Configure Facility Unit     1104         1106

| Feature | Required Authority in SCFPA System | Navigation |
|---|---|---|
| Add/Edit/Delete Facility Unit under a Facility Organization | Any user associated to a role having the privilege to access the feature ID "Configure Facility Unit" can access and perform these operations for a facility organization | System Administration-Configure Facility Unit |

Configure Input/Output Variable     1108

| Feature | Required Authority in SCFPA System | Navigation |
|---|---|---|
| Add/Edit/Delete Input/Output Variable under a Facility Organization | Any user associated to a role having the privilege to access the feature ID "Configure Input/Output Variable" can access and perform these operations for a facility organization | System Administration-Configure Input/Output Variable |

Configure Role     1110

| Feature | Required Authority in SCFPA System | Navigation |
|---|---|---|
| Add/Edit/Delete Role | Any user associated to a role having the privilege to access the feature ID "Configure Role" can access and perform these operations | System Administration-Configure Role |

Configure User     1112

| Feature | Required Authority in SCFPA System | Navigation |
|---|---|---|
| Add/Edit/Delete User | Any user associated to a role having the privilege to access the feature ID "Configure User" can access and perform these operations | System Administration-Configure User |

Configure Facility Organization     1114

| Feature | Required Authority in SCFPA System | Navigation |
|---|---|---|
| Add/Edit/Delete Facility Organization | Any user associated to a role having the privilege to access the feature ID "Configure Facility Organization" can access and perform these operations | System Administration-Configure Facility Organization |

*FIG. 11*     1116

Batch Upload

| Feature | Required Authority in SCFPA System | Navigation |
|---|---|---|
| Create master data set for a selected facility organization through a batch upload process | Any user associated to a role having the privilege to access the feature ID "Batch Upload" can access and perform this operation | Master Data Collection-Batch Upload |

1202 1204 1206

1208

Manual Data Entry

| Feature | Required Authority in SCFPA System | Navigation |
|---|---|---|
| Create/Edit/Delete master data set for a selected facility organization through manual data entry process | Any user associated to a role having the privilege to access the feature ID "Manual Data Entry" can access and perform this operation | Master Data Collection-Manual Data Entry |

1302
Create New Project  1304  1306

| Feature | Required Authority in SCFPA System | Navigation |
|---|---|---|
| Create New Project | Any user associated to a role having the privilege to access the feature ID "Create/Open/Delete Project" can access and perform this operation | Performance Analysis–Create New Project |

Open Existing Project  1308

| Feature | Required Authority in SCFPA System | Navigation |
|---|---|---|
| Open an Existing Project | Any user associated to a role having the privilege to access the feature ID "Create/Open/Delete Project" can access and perform this operation | Performance Analysis–Open Existing Project |

Delete Project  1310

| Feature | Required Authority in SCFPA System | Navigation |
|---|---|---|
| Delete an Existing Project | Any user associated to a role having the privilege to access the feature ID "Create/Open/Delete Project" can access and perform this operation | Performance Analysis–Delete Project |

Efficiency Evaluation  1312

| Feature | Required Authority in SCFPA System | Navigation |
|---|---|---|
| Perform Efficiency Evaluation for an Existing Project | Any user associated to a role having the privilege to access the feature ID "Efficiency Evaluation" can access and perform this operation | Performance Analysis–Efficiency Evaluation |

Analysis Tool  1314

| Feature | Required Authority in SCFPA System | Navigation |
|---|---|---|
| Perform Correlation and Sensitivity Analysis on Projects | Any user associated to a role having the privilege to access the feature ID "Analysis Tool" can access and perform this operation | Performance Analysis–Analysis Tool |

Efficiency Evaluation Report

| Feature | Required Authority in SCFPA System | Navigation |
|---|---|---|
| View Efficiency Evaluation Reports for Different Projects | Any user associated to a role having the privilege to access the feature ID "Efficiency Evaluation Report" can access and view this report | Reports– Efficiency Evaluation Report |

1408

Correlation Analysis Report

| Feature | Required Authority in SCFPA System | Navigation |
|---|---|---|
| View Correlation Analysis Reports for Different Projects | Any user associated to a role having the privilege to access the feature ID "Correlation Analysis Report" can access and view this report | Reports– Correlation Analysis Report |

1410

Sensitivity Analysis Report

| Feature | Required Authority in SCFPA System | Navigation |
|---|---|---|
| View Sensitivity Analysis Reports for Different Projects | Any user associated to a role having the privilege to access the feature ID "Sensitivity Analysis Report" can access and view this report | Reports– Sensitivity Analysis Report |

SUPPLY CHAIN FACILITY PERFORMANCE ANALYZER

BACKGROUND OF THE INVENTION

The present disclosure relates generally to supply chain performance management, and in particular, to a method for supporting a common performance management process.

In today's global marketplace, business units within an enterprise typically deal with multiple supply chain facilities spread out over a wide geographic region. Supply chain facilities may be associated with any parties involved in the supply chain process such as suppliers, cross-docks, plants, distribution centers and dealers. Optimally, these enterprises prefer to maintain business relationships with external supply chain facilities that have consistently demonstrated a high degree of competence in terms of their abilities, for example, in satisfying customer orders and in providing timely deliveries. However, effectively managing the performance of supply chain facilities has not been an easy task due to lack of common performance metrics and performance analysis tools. Effective management not only requires the capability of tracking the performance but requires providing recommendations and/or strategies for performance improvement.

A variety of methods have been used to measure and/or analyze the performance of supply chain facilities, including bulk metrics, warehouse performance analysis, regression analysis, productivity ratios, parametric analysis, and data envelope analysis (DEA). Bulk metrics is a conventional method based on a single performance metric, such as freight volume (or weight), operating cost, response time or shipping accuracy, etc. However, these crude metrics do not reflect the real performance of the system which is affected by many other input and output factors including the level of investment in operational resources (such as material handling equipment, information technology, and personnel), facility design and location, and the different types of services provided.

Warehouse performance analysis is a graphical approach based on the uses of people, space, and systems. It visually demonstrates the discrepancy between current and world-class performance; however, it cannot provide a single quantitative measure of performance.

Productivity ratio measures performance based on the ratio of a single-output over a single-input. While parametric analysis does apply to a multiple inputs and outputs setting, an explicit functional form and a set of weights need to be given a priori, for the production function. Similar to regression analysis, a regression function has to be pre-specified. In addition, the standard regression model only derives an average level of a single output from a given bundle of inputs, not the maximum achievable outcome. Therefore, it is not appropriate to be used for performance analysis.

DEA is recognized as a non-parametric, optimization-based method for measuring performance. It has multiple advantages over the aforementioned methods in that (1) it derives a quantitative measure based on both input and output factors, (2) it handles multiple inputs and outputs, (3) it relies only on sampled data, there is no need for a priori information regarding the functional form and which inputs and outputs are most important, and (4) it provides relative efficiency ranking based on linear programming optimization.

The process, inputs and outputs of performance analysis can vary greatly for different supply chain facilities within a single enterprise. It can be difficult to get an entire enterprise to utilize a common tool for supply chain facility performance analysis. Such tools are typically difficult to adapt to differing types of supply chain facilities with different kinds of performance criteria. This lack of adaptability can make the tool difficult to use and can lead to a lack of use by the business units within the enterprise. As a result, business units continue to rely on their locally developed methods of supply chain performance management and performance analysis.

What is needed is a common, enterprise wide tool for supporting supply chain facility performance analysis. The tool should be flexible enough to allow for process variations for different types of supply chain partners and for different business unit requirements, while still retaining a common core analysis process that is used to support performance management for all supply chain facilities utilized by the enterprise. The tool should support a process of analyzing supply chain facilities performance in an adaptive and comprehensive manner. In addition, the tool should support the creation of improvement prescriptions for supply chain facilities based on the results of the analysis.

BRIEF DESCRIPTION OF THE INVENTION

One aspect is a method of supply chain facility performance analysis. The method includes maintaining supply chain facility configuration information for a plurality of supply chain facilities. The method also includes identifying variables that are attributed to performance of the supply chain facilities. Data corresponding to one or more of the variables for selected supply chain facilities in the plurality of supply chain facilities is collected. Performance analysis is performed for the supply chain facilities using the data as input. The performance analysis includes executing a data envelope analysis (DEA) based three-stage performance analysis model, executing a statistical analysis and executing a sensitivity analysis. The results of the performance analysis are output. The results include a performance ranking of the selected supply chain facilities, a prescription for performance improvement, a correlation analysis, and a sensitivity analysis.

Another aspect is a system for supporting supply chain facility performance analysis. The system includes an input module in communication with a network for receiving supply chain facility configuration information for a plurality of supply chain facilities and data corresponding to one or more performance variables for the supply chain facilities. The system also includes a processing module in communication with the input module for performing performance analysis for the supply chain facilities using the data as input to the performing. The performance analysis includes executing a DEA based three-stage performance analysis model, executing a statistical analysis and executing a sensitivity analysis. The system further includes an output module in communication with the processing module for outputting the results of the performance analysis. The results include a performance ranking of the supply chain facilities, a prescription for performance improvement, a correlation analysis, and a sensitivity analysis.

A further aspect is a computer program product for supporting supply chain facility performance analysis. The computer program product includes a storage medium readable by a processing circuit and storing instructions for execution by the processing circuit for performing a method. The method includes maintaining supply chain facility configuration information for a plurality of supply chain facilities. The method also includes identifying variables that are attributed to performance of the supply chain facilities. Data corresponding to one or more of the variables for selected supply chain facilities in the plurality of supply chain facilities is collected. Performance analysis is performed for the selected supply chain facilities using the data as input. The performance analysis includes executing a data envelope analysis (DEA) based performance analysis model, executing a statistical analysis and executing a sensitivity analysis. The results of the performance analysis are output. The results include a performance ranking of the selected supply chain facilities, a prescription for performance improvement, a correlation analysis, and a sensitivity analysis.

BRIEF DESCRIPTION OF THE DRAWINGS

Referring to the exemplary drawings wherein like elements are numbered alike in the several FIGURES:

FIG. 9 is a table illustrating the three different levels of users that may be implemented by exemplary embodiments;

FIG. 11 illustrates a plurality of tables of a systems administration screen that may be implemented by exemplary embodiments;

FIG. 12 illustrates a plurality of tables of a master data collection screen that may be implemented by exemplary embodiments;

FIG. 13 illustrates a plurality of tables of a performance analysis screen that may be implemented by exemplary embodiments; and FIG. 14 illustrates a plurality of tables of a reports screen that may be implemented by exemplary embodiments.

DETAILED DESCRIPTION OF EXEMPLARY EMBODIMENTS

Exemplary embodiments provide an enterprise wide supply chain performance management methodology and process for analyzing the performance of supply chain facilities in an adaptive and comprehensive manner. In exemplary embodiments, the supply chain performance management methodology and process is implemented by computer software. By using a common software tool (referred to herein as the supply chain facility performance analyzer or "SCFPA"), a consistent supply chain performance management methodology and process can be implemented by all locations and business units of an enterprise to evaluate supply chain facilities.

The SCFPA described herein captures resource consumption, output generation and uncontrollable exogenous factors at a supply chain facility in support of providing a comprehensive and fair performance measurement scheme. In addition, the SCFPA tracks (and allows a user to visualize) a systematic view of supply chain performance over time for all facilities in the supply chain. Further, the SCFPA provides insights to management on supply chain facility performance evaluation, possible improvement prescriptions, contract management, and resource allocations. In exemplary embodiments, this is achieved by using data envelope analysis (DEA) based performance analysis model, as well as sensitivity and statistical analyses.

Figure 1:
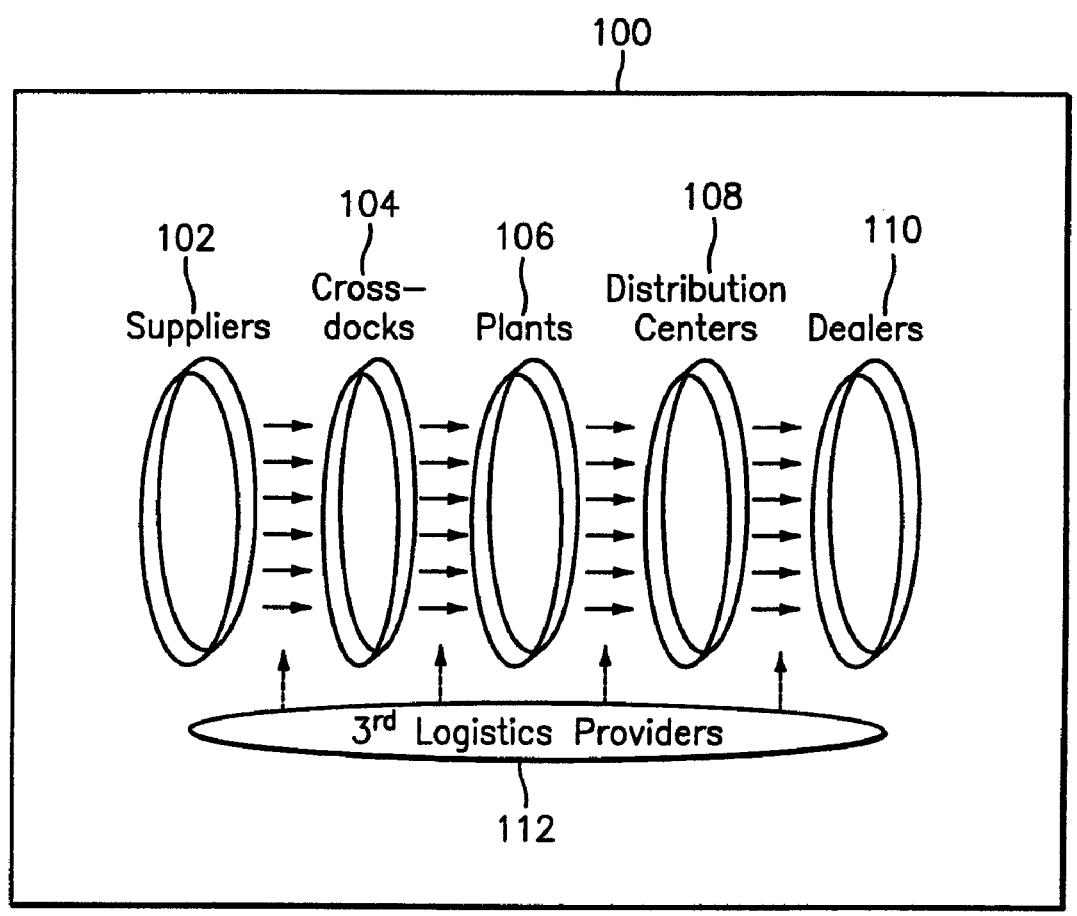
FIG. 1 illustrates exemplary supply chain facilities that may be analyzed using exemplary embodiments.

Exemplary embodiments provide for a web-based SCFPA tool for common supply chain facility performance management. It is applicable to any party in the supply chain including, but not limited to, suppliers, cross-docks, plants, distribution centers, dealers, and third party logistic providers. FIG. 1 illustrates an exemplary scope of a web-based SCFPA tool for common supply chain facility performance management processes. The web-based performance analysis decision support tool may be utilized to analyze performance at suppliers 102, cross-docks 104, plants 106, distribution centers 108, dealers 110, and third-party logistics providers 112.

The SCFPA tool provides a fair and comprehensive performance measurement scheme capturing resource consumption and output generation, as well as uncontrollable exogenous factors. In addition, the SCFPA tool may be utilized to track and/or visualize a systematic view of supply chain performance over time for all facility units. The SCFPA tool provides powerful insights to management on performance evaluation, improvement prescriptions, contract management and resource allocations. These insights are provided through the use of DEA, sensitivity, and statistical analyses. Therefore, such a powerful tool is desirable at a company and other supply chain related industries to assist the management team.

In exemplary embodiments, the SCFPA provides a core performance analysis engine including efficiency evaluation models, and various statistical and sensitivity analyses. Output from this performance analysis assists in identifying the sources of inefficiency and provides management with suggestions for improvement (both operational and strategic). Output from the performance analysis can further assist contract management and resource allocation. The SCFPA also maintains and displays configuration information about supply chain facility organizations, facility units, and roles and users. For each facility of a given supply chain organization (e.g., cross-dock, warehouse), the users of the SCFPA are assisted in identifying what input and output variables for measuring performance.

Additionally, exemplary embodiments of the SCFPA provide a centralized facility for data acquisition from distributed supply chain facilities; stores and displays all of the input and output variables affecting the efficiency and performance of the supply chain facility organizations. Finally, the SCFPA stores and displays the results of the performance analysis and exported reports of efficiency evaluation, correlation analysis, and sensitivity analysis in tabular and graphical formats.

Figure 2:
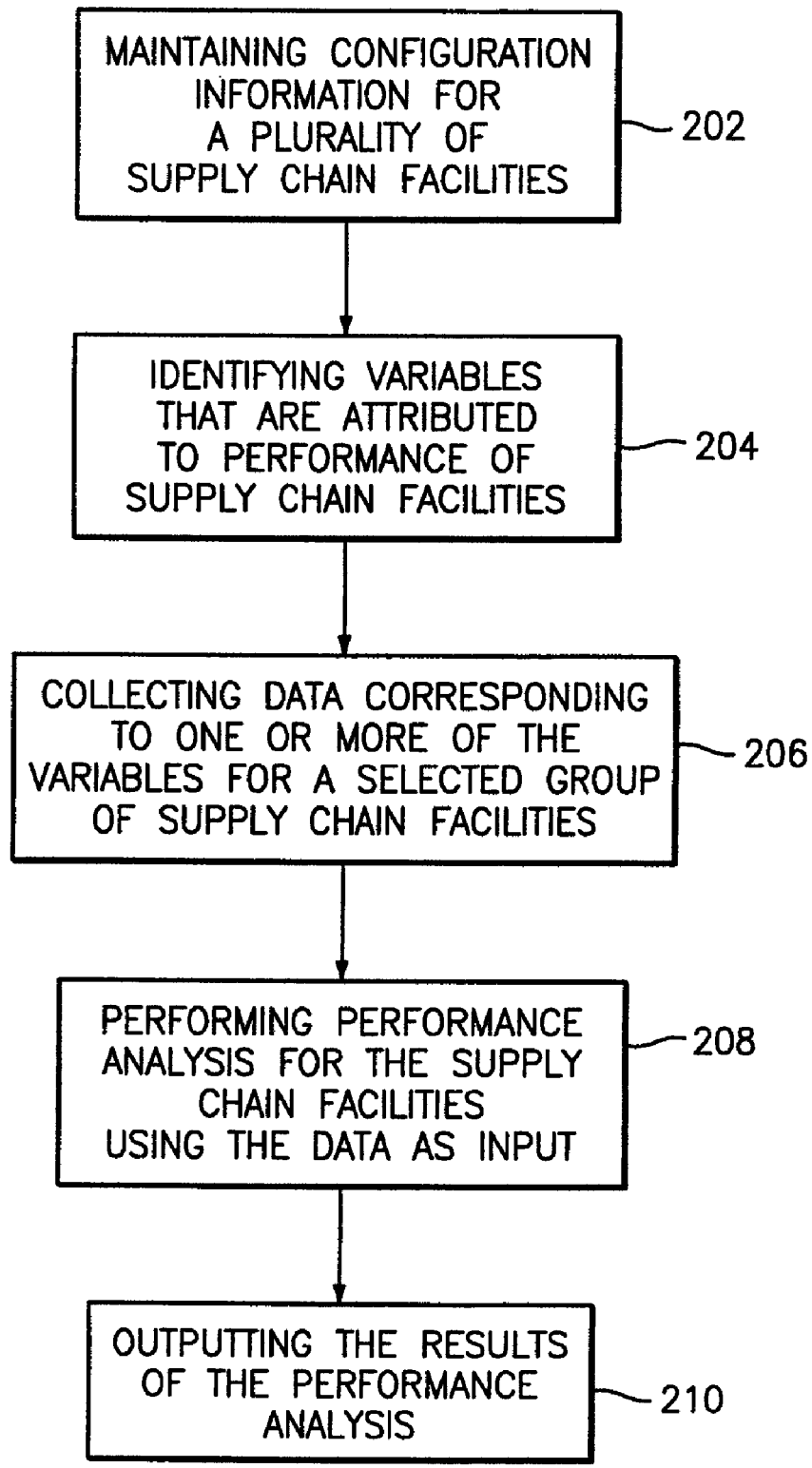
FIG. 2 depicts an exemplary process that may be implemented by exemplary embodiments.

FIG. 2 depicts an exemplary process that may be implemented by the SCFPA as described herein. At block 202, configuration information for a plurality of supply chain facilities is maintained. Supply chain facility configuration information may include, but is not limited to: supply chain facility organization, facility units, roles and users. At block 204, variables (input and output) that are attributed to supply chain facility performance of the supply chain facilities are identified. In exemplary embodiments, identifying the variables includes validating a model (e.g., the DEA based three-stage performance analysis model) by examining the variable sets for factors such as the number of variables and the number of facilities, and adjusting these factors as required by the model. Supply chain facilities may be characterized by organization, or type, of facility (e.g., cross-dock, warehouse) with a different set of variables assigned to different types of facilities. In exemplary embodiments, variables that are attributed to performance of the supply chain facilities that belong to a selected supply chain facility organization are identified. Supply chain facilities that belong to the selected supply chain facility organization (or a subset of them) are then analyzed by the SCFPA.

At block 206, data corresponding to one or more of the variables for the selected supply chain facilities is collected. The data may include current data and/or historical data. At block 208 in FIG. 2, performance analysis is performed for the selected supply chain facilities using the data as input to the performing. The performance analysis includes executing a data envelope analysis (DEA) based performance evaluation model, a statistical analysis (e.g., correlation analysis), and a sensitivity analysis. In exemplary embodiments, the DEA outputs include a performance ranking of the selected supply chain facilities, correlation and sensitivity analysis, an improvement prescription, a contract management plan and resource allocation results for the supply chain facilities. At block 210, the results of the performing are output. The results can be output to one or more of a display screen on a user device and storage device.

Figure 3:
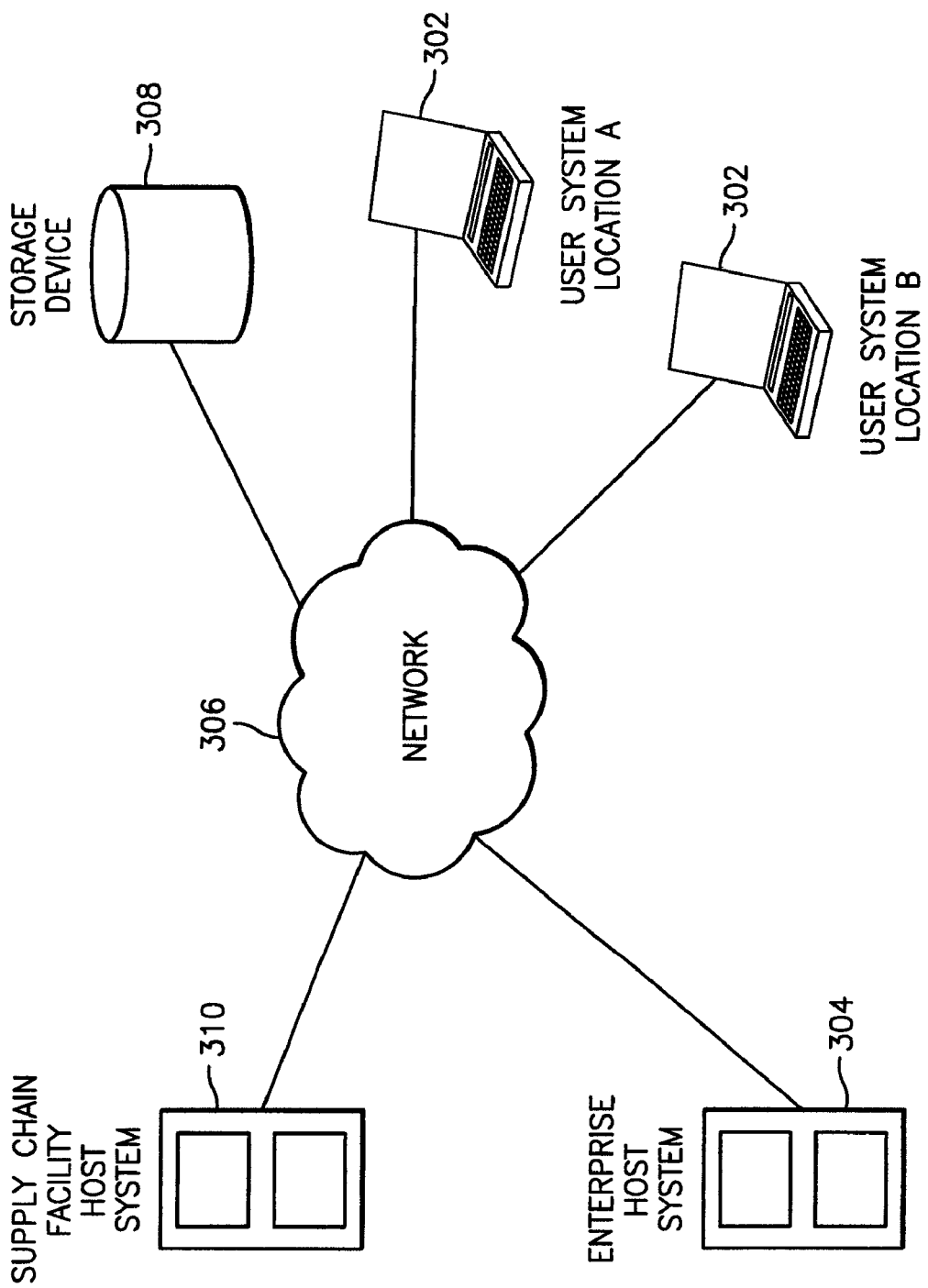
FIG. 3 is a block diagram of an exemplary system that may be implemented by exemplary embodiments.

FIG. 3, a block diagram of an exemplary system for providing SCFPA is generally shown. The system includes one or more user systems 302 through which users at one or more geographic locations contact an enterprise host system 304 to access SCFPA, a software tool. The enterprise host system 304 executes the application program (e.g., the SCFPA tool) and the user systems 302 are coupled to the enterprise host system 304 via a network 306. Each user system 302 is implemented using a general-purpose computer executing a computer program for carrying out the processes described herein. The user systems 302 may be personal computers (e.g., a lap top, a personal digital assistant) or host attached terminals. If the user systems 302 are personal computers, the processing described herein is shared by a user system 302 and the enterprise host system 304 (e.g., by providing an applet to the user system 302). The user systems 302 may be located at a business enterprise location and/or at a supply chain facility for access to selected portions of the SCFPA by the users.

The network 306 may be any type of known network including, but not limited to, a wide area network (WAN), a local area network (LAN), a global network (e.g., Internet), a virtual private network (VPN), and an intranet. The network 306 may be implemented using a wireless network or any kind of physical network implementation known in the art. A user system 302 may be coupled to the host system through multiple networks (e.g., intranet and Internet) so that not all user systems 302 are coupled to the enterprise host system 304 through the same network. One or more of the user systems 302 and the enterprise host system 304 may be connected to the network 306 in a wireless fashion. In one embodiment, the network is the Internet and one or more user systems 302 execute a user interface application (e.g. a web browser) to contact the enterprise host system 304 through the network 306 while another user system 302 is directly connected to the enterprise host system 304. In another exemplary embodiment, the user system 302 is connected directly (i.e., not through the network 306) to the enterprise host system 304 and the enterprise host system 304 is connected directly to or contains the storage device 308. In another exemplary embodiment, the user system 302 includes a stand-alone application program for executing SCFPA tool.

In exemplary embodiments information and data being transferred via the network (or in the network) is encrypted. Different types of information and data may be encrypted with different encryption keys. This allows information and/or data about a supply chain facility to be kept secret from parties who do not have the encryption key that corresponds to the supply chain facility. The SCFPA tool may be used by Original Equipment Manufacturers (OEMs) to evaluate the performance of their contracted supply chain facilities. The OEM collects data via the network from all contracted facilities and the data about all the contracted facilities is only available to OEM analysts/users because the network is encrypted. However, data about an individual facility may be made available to authorized users at the facility through the user of an encryption key.

The storage device 308 is implemented using a variety of devices for storing electronic information. It is understood that the storage device 308 may be implemented using memory contained in the enterprise host system 304 or it may be a separate physical device. The storage device 308 is logically addressable as a consolidated data source across a distributed environment that includes a network 306. Information stored in the storage device 308 is retrieved and manipulated via the enterprise host system 304. The storage device 308 includes, for example, configuration data and variable data for supply chain facilities, as modeling data such as variables required by particular supply chain facilities, models to be executed, and the results of executing the performance analysis. The storage device 308 may also include other kinds of data such as information concerning the updating of the data is the storage device (e.g., a user identifier, date, and time of update). The enterprise host system 304 depicted in FIG. 3 is implemented using one or more servers operating in response to a computer program stored in a storage medium accessible by the server. The enterprise host system 304 operates as a network server (e.g., a web server) to communicate with the user system 302 and the supplier host system 310 (e.g., for collecting data for use in analysis, for reporting results of analysis, etc.). The enterprise host system 304 handles sending and receiving information to and from the user system 302 and can perform associated tasks. The enterprise host system 304 may also include a firewall to prevent unauthorized access to the enterprise host system 304 and enforce any limitations on authorized access. For instance, an administrator may have access to the entire system and have authority to modify portions of the system. A firewall may be implemented using conventional hardware and/or software as is known in the art.

The enterprise host system 304 may also operate as an application server. The enterprise host system 304 executes one or more computer programs to execute the SCFPA. In exemplary embodiments, the computer programs include an input module for receiving data, a processing module for facilitating the performance analysis, and an output module for outputting the results of the performance analysis. Processing may be shared by the user system 302 and the enterprise host system 304 by providing an application (e.g., java applet) to the user system 302. Alternatively, the user system 302 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 4:
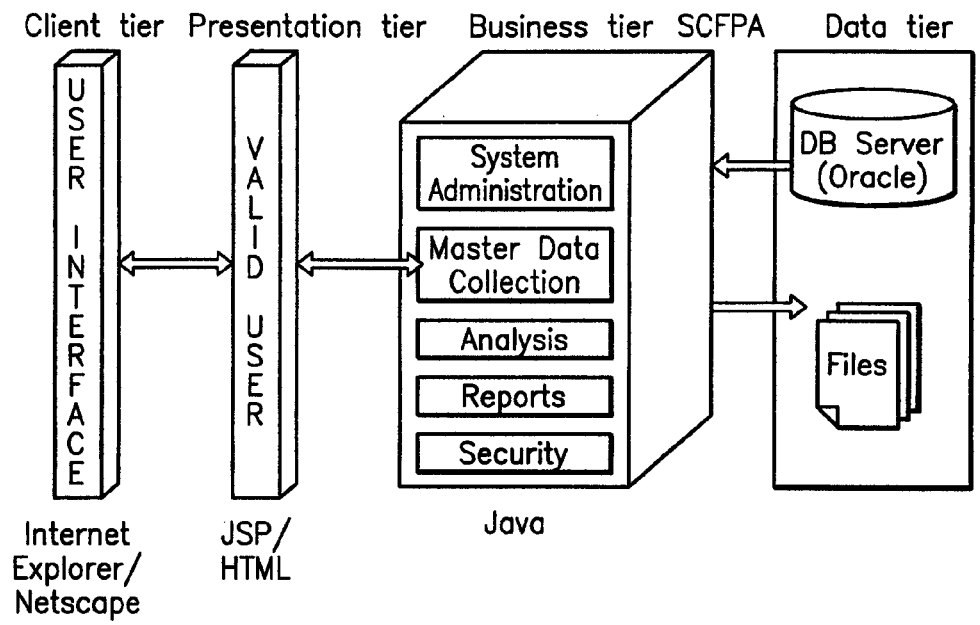
FIG. 4 depicts an exemplary system implemented as a multi-tier enterprise application in exemplary embodiments.
Figure 5:
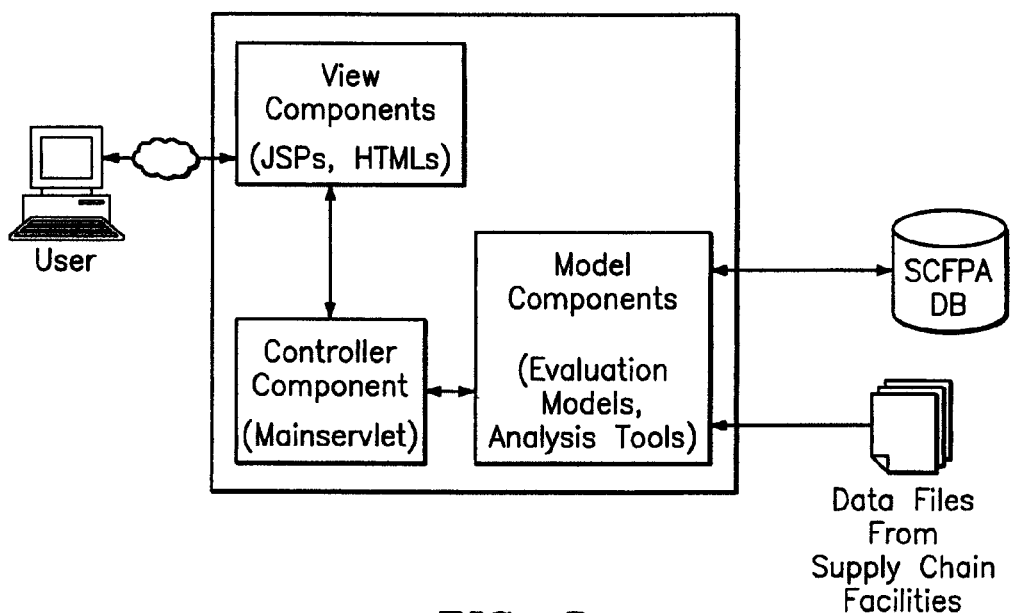
FIG. 5 depicts a logic view of the exemplary system in FIG. 4.
Figure 6:
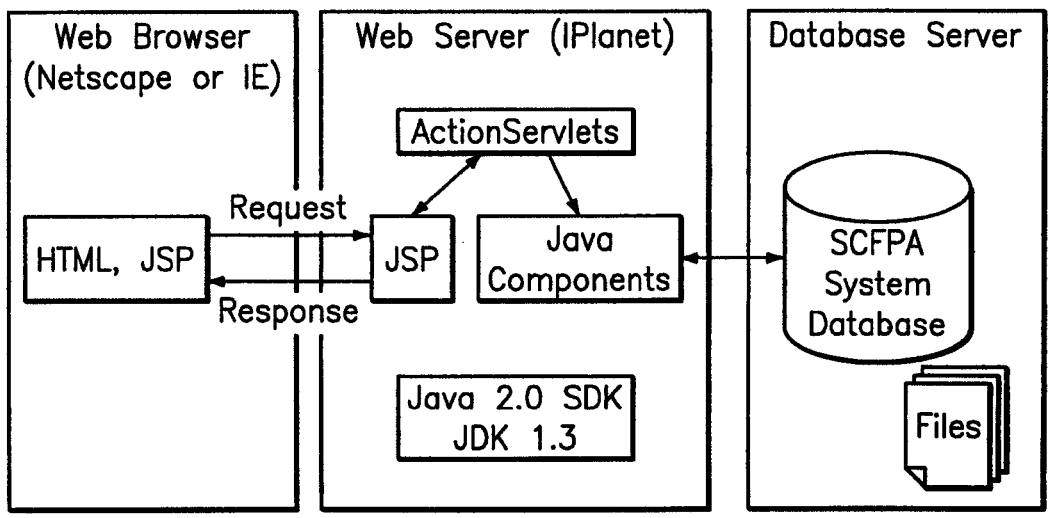
FIG. 6 depicts a process view of the exemplary system in FIG. 4.
Figure 7:
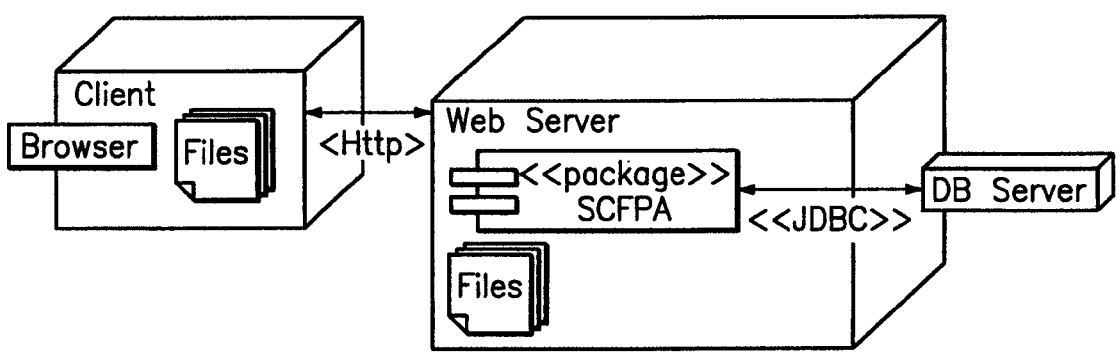
FIG. 7 depicts a deployment view of exemplary system in FIG. 4.

In exemplary embodiments, the SCFPA is implemented as a multi-tier enterprise application as depicted in FIG. 4. The SCFPA depicted in FIG. 4 is represented as a Java2 Platform, Enterprise Edition (J2EE) based model-view-controller (MVC) architecture. FIG. 5 depicts a logic view, FIG. 6 depicts a process view, and FIG. 7 depicts a deployment view of the MVC architecture as used by exemplary embodiments of the SCFPA system.

In exemplary embodiments, the SCFPA tool is web-based decision support tool for efficiency evaluation and performance analysis of supply chain facilities. The SCFPA is powered by a data envelopment analysis (DEA) methodology. The DEA methodology is a non-parametric and optimization-based methodology. The SCFPA supports performance management processes based on a system-wide performance measurement scheme that emphasizes a process for effectively and fairly evaluating the performance of supply chain facilities. In particular, the SCFPA can help identify inefficient facilities while providing improvement prescriptions, and strengthen contract management based on true performance rather than on a single, crude measure. The SCFPA provides a performance evaluation decision support tool with a system-wide performance measurement scheme available.

As described previously, DEA is recognized as a non-parametric, optimization-based method. It has multiple advantages over other evaluation methods including: (1) it derives a quantitative measure based on both input and output factors, (2) it handles multiple inputs and outputs, (3) it relies only on sampled data, there is no need for a priori information regarding the functional form and which inputs and outputs are most important, and (4) it provides relative efficiency ranking for the examined units based on linear programming optimization.

SCFPA is a DEA-based performance analysis decision support tool. One of the strengths of DEA lies in its ability to handle multiple and non-commensurate inputs and outputs. DEA uses actual sample data to derive the efficiency frontier against which each unit in the sample is evaluated with no a priori information regarding which inputs and outputs are most important in the evaluation procedure. The efficiency frontier is generated when a linear programming model is solved to calculate the DEA efficiency score for each facility unit. The basic DEA models seek to determine which of the examined units determine an envelopment surface (or efficiency frontier). Loosely speaking, units that lie on (determine) the surface are deemed efficient. Units that do not lie on the surface are termed inefficient and the analysis provides measures of their relative efficiency.

In exemplary embodiments, due to the large number of non-discretionary variables (i.e., variables such that are not within control of supply chain facility managers), a three-stage model is used for SCFPA in order to properly control for the fixed factors (e.g., facility location, weather condition, etc.). In the first stage of this model, DEA is performed using only discretionary variables. In the second stage, a linear programming optimization is solved to discover possible excesses and shortages for the prescriptions for performance improvement. In the third stage, the efficiency scores obtained from the first stage are regressed on all the non-discretionary factors to separate the inefficiency from environmental effects or decisions that cannot be changed in the short term.

The notation and the DEA based three-stage performance analysis model implemented by exemplary embodiments of SCFPA are as follows:

N: number of facility units
S: number of discretionary inputs
M: number of discretionary outputs
S': number of non-discretionary inputs
M': number of non-discretionary outputs
$\theta_k$: first-stage (input-oriented) efficiency score of facility unit k, k=1,2, ... N
$\eta_k$: first-stage (output-oriented) efficiency score of facility unit k, k=1,2, ... N
$X_{ik}$: discretionary input i of facility unit k, i=1,2, ... S, k=1,2, ... N
$Y_{jk}$: discretionary output j of facility unit k, j=1,2, ... M, k=1,2, ... N
$\lambda_{lk}$: scale parameter of facility unit k, l, k=1,2, ... N
$\Delta_{ik}^{-}$: excess variable, i=1,2, ... S, k=1,2, ... N
$\Delta_{jk}^{+}$: shortage variable, j=1,2, ... M, k=1,2, ... N
$Z_{ik}$: non-discretionary input i of facility unit k, i=1,2, ... S', k=1,2, ... N
$Z_{jk}$: non-discretionary output j of facility unit k, j=S'+1, S'+2, ... S'+M', k=1,2, ... N
$\beta_i$: regression coefficients, i=0, 1, ... S'+M'
$\theta_k^{\wedge}$: second-stage efficiency score of facility unit k, k=1, 2, ... N Stage 1: For each examined facility k, solve/execute the basic DEA model with only those inputs $\{X_{ik}\}$ and outputs $\{Y_{jk}\}$ that are discretionary (i.e., those that are directly affected by the operational decisions).

$$\min \theta_k \quad (1)$$

$$\text{s.t.} \sum_{l=1}^{N} X_{il}\lambda_{lk} \leq \theta_k X_{ik} \quad i=1, 2, \ldots S$$

$$\sum_{l=1}^{N} Y_{jl}\lambda_{lk} \geq Y_{jk} \quad j=1, 2, \ldots M \quad (2)$$

$$\sum_{l=1}^{N} \lambda_{lk} = 1 \quad (3)$$

$$\lambda_{lk} \geq 0, \quad l=1, 2, \ldots N$$

$$\theta_k \text{ unconstrained}$$

The first stage efficiency score is denoted by the optimal value $\theta_k^*$, and $\Delta_{ik}^{-}$ and $\Delta_{ik}^{+}$ are the slack variables of constraints (1) and (2).

Stage 2: To ensure that the optimal efficiency score $\theta_k^*$ is reached with zero slackness in all constraints, the following linear program is solved to discover the possible excesses and shortages:

$$\min -\sum_{i=1}^{S} \Delta_{ik}^{-} - \sum_{j=1}^{M} \Delta_{jk}^{+}$$

$$\text{s.t.} \ \Delta_{ik}^{-} + \sum_{l=1}^{N} X_{il}\lambda_{lk} = \theta_k^* X_{ik} \quad i=1, 2, \ldots S$$

$$\Delta_{jk}^{+} - \sum_{l=1}^{N} Y_{jl}\lambda_{lk} = -Y_{jk} \quad j=1, 2, \ldots M$$

$$\sum_{l=1}^{N} \lambda_{lk} = 1$$

$$\lambda_{lk} \geq 0, \quad l=1, 2, \ldots N$$

$$\Delta_{ik}^{-} \geq 0, \Delta_{jk}^{+} \geq 0, i=1, 2, \ldots S, \quad j=1, 2, \ldots M$$

The possible excesses and shortages provide the prescriptions for performance improvement.

Stage 3: Regress the non-discretionary input and output variables $\{Z_{ik}\}$ onto the first stage efficiency scores $\theta_k^*$ in the following equations: $\theta_k^* = \beta_o + \beta_l Z_{lk} + \ldots + \beta_{s'+m'} Z_{s'+m', k}$, $k=1, 2, \ldots N$. Box-Cox transformation is performed on the data to decide whether a standard regression model is appropriate.

The previous text has described one method for using DEA-based three-stage performance analysis model to perform supply chain facility performance analysis. Here, the basic DEA model may take two forms of orientation. An input-oriented model minimizes inputs or consumed resources while producing at least the given outputs, whereas output-oriented model maximizes outputs while consuming no more than the observed amount of inputs. The equation constraint (3): $\lambda_{1k} + \lambda_{2k+} \ldots + \lambda_{Nk} = 1$ captures the variable return-to-scale. In the case of constant return-to-scale, where inputs and outputs can be scaled linearly without increasing or decreasing efficiency, the constraint (3) will not be included.

Figure 8:
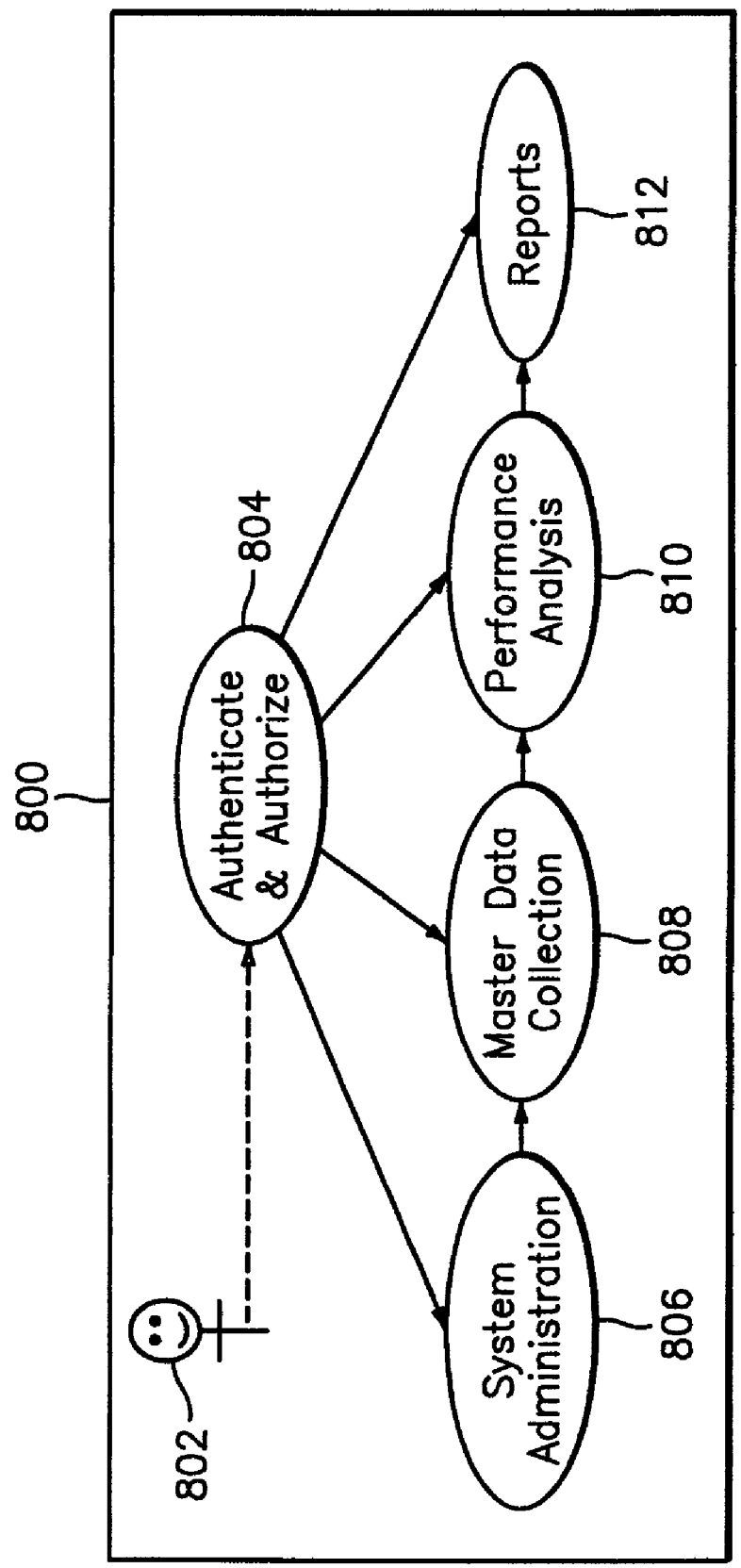
FIG. 8 illustrates a high level diagram of an analysis or decision support tool that may be implemented by exemplary embodiments.

Referring to FIG. 8, a high level diagram of an exemplary SCFPA framework is illustrated. The SCFPA framework 800 includes a user 802 who accesses the SCFPA tool, an authentication and authorization unit 804, a system administration unit 806, a master data collection unit 808, a performance analysis unit 810, and a reports unit 812.

Specifically, the SCFPA tool has the following major features of: (1) maintaining and displaying configuration information of supply chain facility organizations, facility units, and roles and users, (2) centralizing the data acquisition from distributed supply chain facilities, (3) storing and displaying all the input and output variables affecting the efficiency and performance of the supply chain facility organizations, (4) providing the core of performance analysis engine including data validation, efficiency evaluation models, and various statistical and sensitivity analyses, and (5) storing and displaying the results and exported reports of efficiency evaluation, correlation analysis and sensitivity analysis in tabular and graphical formats.

In addition, the SCFPA has primarily three different levels of users:

A system administrator that has all administrative privileges including configuring supply chain facility organizations, facility units, roles, other users in the system, and to enter the master data for various input and output variables used in evaluating the performance of various supply chain facility organizations.

An evaluator has the privileges to create new projects, open existing projects, evaluate efficiency for different projects, perform correlation and sensitivity analysis, and view the reports in tabular and/or graphical formats.

A decision maker is similar in scope to that of an evaluator except that this role has an additional privilege of making decisions based on the performance results using different analysis tools.

Referring to FIG. 9, a table 900 illustrating the three different levels of users of the SCFPA is shown. The left-hand column of the table 900 shows a row for a system administrator 908, an evaluator 910, and a decision maker 912. The vertical columns of table 900 show a users column 902, and a task-level goal column 904. The users column 902 includes the system administrator 908, the evaluator 910, and the decision maker 912. The tasks of the system administrator 908 include configuring supply chain facility organizations, configuring facility units, configuring input/output variables, configuring other roles, etc. The tasks of the evaluator 910 include creating new projects, opening existing projects, evaluating efficiency, performing sensitivity and correlation analysis, and viewing reports. The tasks of the decision maker 912 include creating new projects, opening existing projects, evaluating efficiency, performing sensitivity and correlation analysis, viewing reports, and making decisions.

Figure 10:
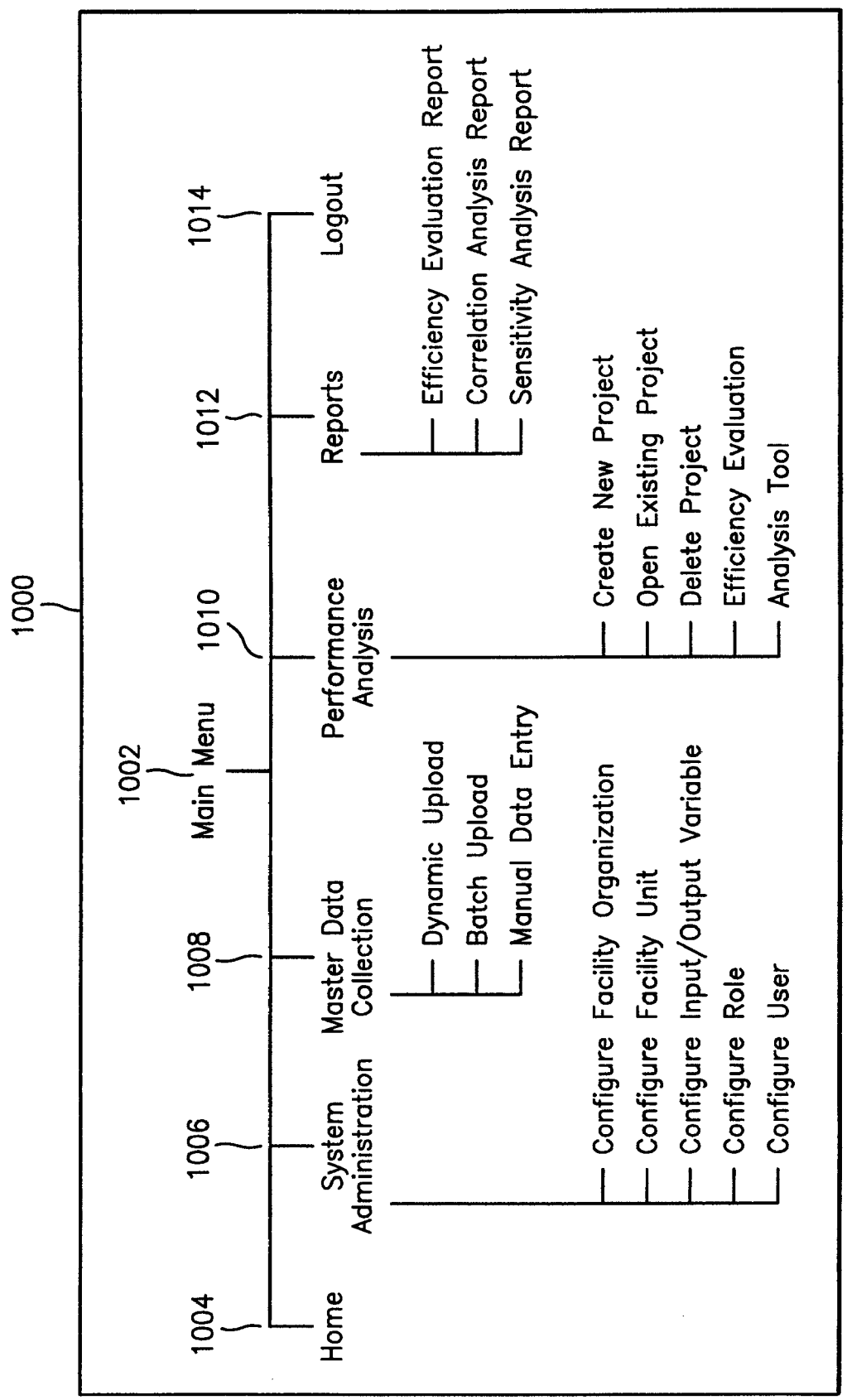
FIG. 10 illustrates a tree-structures site map with several menus that may be implemented by exemplary embodiments.

Referring to FIG. 10, exemplary SCFPA menus (including sub-menus) are described via a site map with several main screens. FIG. 10 displays the tree-structures site map 1000 of the SCFPA menus, which include a main menu 1002, a home screen 1004, a system administrator screen 1006, a master data collection screen 1008, a performance analysis screen 1010, a reports screen 1012, and a logout screen 1014.

The system administration screen 1006 includes the tasks: configure facility organization, configure facility unit, configure input/output variable, configure role, and configure user.

The master data collection screen 1008 includes the tasks: dynamic upload, batch upload, and manual data entry.

The performance analysis screen 1010 includes the tasks: create a new project, open an existing project, delete one or more projects, efficiency evaluation, and analysis tool.

The reports screen 1012 includes creating the following reports: efficiency evaluation report, correlation analysis report, and sensitivity analysis report.

Therefore, with reference to FIG. 10, the SCFPA provides role-based security access to different features and menus. Each feature is identified by a sub-menu option. The sub-menus are logically grouped and associated to a main menu option. Each role created in the system is associated to one or many features (sub-menus). A user is associated to a role in the system and hence can access all the features (sub-menus) associated to the role. SCFPA system also provides role based facility organization access. For each configured facility organization, the system allows the user (who has the privileges to "Configure Role") to associate the facility organization(s) to a role. Therefore any user associated to this role has access to the associated facility organization(s).

The system administration screen 1006 includes a plurality of tables analyzing the tasks of a user. FIG. 11 depicts exemplary tables for analyzing the tasks of a user. Specifically, the tables include: a configure facility unit table 1108, a configure input/output variable table 1110, a configure role table 1112, a configure user table 1114, and a configure facility organization 1116. Each of the tables includes a feature column 1102, a required authority in SCFPA system column 1104, and a navigation column 1106. In other words, the systems administration screen 1006 provides a system administrator with the ability to configure different facility organizations, configure and associate different facility units, input/output variables to an existing facility organization, configure various roles, associate different features (sub-menus), facilitate organizations to roles, configure various users, and associate the various users to a role.

The variables may be categorized as being discretionary or non-discretionary. Discretionary variables are those that can be influenced by the operational decisions of a supply chain facility management team. In contrast, non-discretionary variables are typically those factors that are associated with environmental and economical conditions (such as weather, income level, etc.) or subject to long-term decisions that are not easily influenced by operational decisions (such as facility location selection and layout design).

The master data collection screen 1008 includes a plurality of tables for analyzing the tasks of a user. FIG. 12 depicts exemplary tables for analyzing the tasks of a user. Specifically, the tables include: a batch upload table 1208, and a manual data entry table 1210. Each of the tables includes a feature column 1202, a required authority in SCFPA system column 1204, and a navigation column 1206. In other words, the data collection screen 1008 provides a system administrator the ability to obtain master data for a facility organization. Using a dynamic upload, batch upload, and a manual data entry creates the master data set. Different users use the master data set for creating projects in order to perform efficiency evaluation and analysis (correlation analysis and sensitivity analysis).

The performance analysis screen 1010 includes a plurality of tables for analyzing the tasks of a user. FIG. 13 depicts exemplary tables for analyzing the tasks of a user. Specifically, the tables include: a create new project table 1308, an open existing project table 1310, a delete project table 1312, an efficiency evaluation table 1314, and an analysis tool table 1316. Each of the tables includes a feature column 1302, a required authority in SCFPA system column 1304, and a navigation column 1306. In other words, the performance analysis screen 1010 provides a system administrator the ability to create a new project, open an existing project, delete one or more projects, perform efficiency evaluation, analyze data by using correlation and sensitivity tools, and save the results.

In exemplary embodiments, the performance analysis also includes performing validation of the data and creating efficiency evaluation models.

The reports screen 1012 includes a plurality of tables for analyzing the tasks of a user. FIG. 14 depicts exemplary tables for analyzing the tasks of a user. Specifically, the tables include: an efficiency evaluation report table 1408, a correlation analysis report table 1410, and a sensitivity analysis report table 1412. Each of the tables includes a feature column 1402, a required authority in SCFPA system column 1404, and a navigation column 1406. In other words, the reports screen 1012 provides a system administrator the ability to view the efficiency evaluation, and to create correlation analysis and sensitivity reports for various projects. The reports may be displayed in tabular and/or graphical forms and can also be exported into a spreadsheet program.

Moreover, SCFPA provides role-based security access to different features implemented in the system. Each feature is identified by a sub-menu option. The sub-menus are logically grouped and associated to a main menu option. Each role created in the system is associated to one or more features (sub-menus). A user is associated to a role in the system and thus can access all the features (sub-menus) associated with the role.

Also, the system provides a default role, "SYSADMIN" role, which has access to all features (sub-menus). A default user "sysadmin" is associated with the "SYSASMIN" role. This default role and the user cannot be deleted from the system at any point of time, and no other users can be associated with the "SYSADMIN" role. Note that the main menu options are enabled and available to all users or roles. However, since the features (sub-menus) are associated to the different users, they are enabled/disabled based on the access privileges configured in the system. Apart from role-based security, the SCFPA system also provides role based facility organization access. For each configured facility organization, the system allows the user (who has the privileges to "Configure Role") to associate the facility organization(s) to a role. Therefore, any user associated with this role has access to the associated facility organization(s).

In addition, whenever a user logs into the system, a session is created if the user is a valid user. When the user exits the application, then the session is terminated. The session is maintained to store the client's state. A web server can use several methods to associate a session with a user, all of which involve passing an identifier between the client and the server. The identifier can be maintained on the client as a cookie. Also, each session has an associated timeout, so that its resources can be claimed whenever a user does not interact with the system within a predetermined period of time after creating the session.

Technical effects include the ability to provide a user-friendly decision support tool with a system-wide supply chain facility performance measurement scheme to assist a company in applying a common performance management process. The significance of developing such a performance analysis decision support tool lies in the capabilities of: (1) providing a performance measurement scheme that emphasizes a company's key interests, (2) evaluating a company's supply chain facility performance in a fair and effective manner, (3) identifying the sources of inefficiency and providing management with means of improvement both operational and strategic, and (4) assisting resource allocation and contract management.

Exemplary embodiments support a common performance management process by: improving supply chain and organizational productivity and efficiency, by reducing waste/costs while maximizing resource utilization, assisting supply chain managers who oversee supply chain performance evaluation and improvement, and assist executives who require quantitative decision support for performance assessment, contract management and budget resource allocations.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of supply chain facility performance analysis, the method comprising:

maintaining, via a computer processor, supply chain facility configuration information for a plurality of supply chain facilities, the plurality of supply chain facilities classified by supply chain facility organization type;

identifying, via the computer processor, variables that are attributed to performance of the supply chain facilities, the variables for each of the plurality of supply chain facilities vary according to the supply chain facility organization type;

collecting, via the computer processor, data corresponding to one or more of the variables for selected supply chain facilities in the plurality of supply chain facilities;

performing, via the computer processor, performance analysis for the selected supply chain facilities using the data as input, the performance analysis including executing a data envelope analysis (DEA) based three-stage performance analysis model, executing a statistical analysis and executing a sensitivity analysis; and outputting, via the computer processor, the results of the performance analysis to at least one of a display screen and a storage device, the results including a performance ranking of the selected supply chain facilities, the prescriptions for performance improvement, and results of the correlation analysis and the sensitivity analysis;

wherein executing the data envelope analysis (DEA) based three-stage performance analysis model comprises:

performing a first stage DEA analysis on only the data that is attributable to discretionary variables and deriving efficiency scores resulting from the first stage DEA analysis;

performing a second stage linear programming optimization and discovering any excesses and shortages that provide prescriptions for performance improvement based on the second stage linear programming optimization; and regressing the data attributable to non-discretionary variables onto the efficiency scores and distinguishing inefficiencies attributable to the discretionary variables from inefficiencies attributable to the non-discretionary variables.

2. The method of claim 1 wherein the data includes historical data.

3. The method of claim 1 wherein supply chain facility organization types include:
suppliers;
cross-docks;
manufacturing plants;
distribution centers; and
dealers.

4. The method of claim 1 wherein the selected supply chain facilities are characterized by the same supply chain facility organization type.

5. The method of claim 1 wherein the identifying variables includes validating the model to be used in the performance analysis.

6. The method of claim 1 wherein the collecting data includes receiving the data from a centralized facility that collects the data for one or more of the variables for a plurality of supply chain facilities.

7. The method of claim 1 wherein the variables are stored in the storage device and the identifying includes accessing the variables on the storage device.

8. The method of claim 1, wherein the variables are classified by the discretionary variables and the non-discretionary variables, the discretionary variables specifying data that is affected by operational decisions of a corresponding supply chain facility, and the non-discretionary variables specifying data that is not affected by operational decisions made by a corresponding supply chain facility.

9. A system for supporting supply chain facility performance analysis, the system comprising:

a computer processor; and an input module, a processing module, and an output module implemented by the computer processor, wherein:

the input module is in communication with a network for receiving supply chain facility configuration information for a plurality of supply chain facilities and data corresponding to one or more of the variables that are attributed to performance of for—the supply chain facilities the plurality of supply chain facilities classified by supply chain facility organization type and the variables for each of the plurality of supply chain facilities vary according to the supply chain facility organization type;

the processing module is in communication with the input module for performing performance analysis for selected supply chain facilities using the data as input to the performing, the performance analysis including executing a DEA based three-stage performance analysis model, executing a statistical analysis and executing a sensitivity analysis;

the output module is in communication with the processing module for outputting the results of the performance analysis, the results including a performance ranking of the selected supply chain facilities, the prescriptions for performance improvement, and results of the correlation analysis and the sensitivity analysis;

wherein executing the data envelope analysis (DEA) based three-stage performance analysis model comprises:

performing a first stage DEA analysis on only the data that is attributable to discretionary variables and deriving efficiency scores resulting from the first stage DEA analysis;

performing a second stage linear programming optimization and discovering any excesses and shortages that provide prescriptions for performance improvement based on the second stage linear programming optimization; and regressing the data attributable to non-discretionary variables onto the efficiency scores and distinguishing inefficiencies attributable to the discretionary variables from inefficiencies attributable to the non-discretionary variables.

10. The system of claim 9 wherein the data includes historical data.

11. The system of claim 9 wherein supply chain facility organization types include:
suppliers;
cross-docks;
manufacturing plants;
distribution centers; and
dealers.

12. The system of claim 9 wherein the plurality of supply chain facilities are characterized by the same supply chain facility organization type.

13. The system of claim 9 wherein information and data in the network is encrypted.

14. The system of claim 13 wherein different types of information and data are encrypted with different encryption keys.

15. The system of claim 9 wherein the collecting data includes receiving the data from a centralized facility that collects the data from one or more of the supply chain facilities.

16. The system of claim 9, wherein the variables are classified by the discretionary variables and the non-discretionary variables, the discretionary variables specifying data that is affected by operational decisions of a corresponding supply chain facility, and the non-discretionary variables specifying data that is not affected by operational decisions made by a corresponding supply chain facility.

17. A computer program product for supporting supply chain facility performance analysis, the computer program product comprising:
- a storage medium readable by a processing circuit and storing instructions for execution by the processing circuit for performing a method comprising:
- maintaining supply chain facility configuration information for a plurality of supply chain facilities, the plurality of supply chain facilities classified by supply chain facility organization type;
- identifying variables that are attributed to performance of the supply chain facilities the variables for each of the plurality of supply chain facilities vary according to the supply chain facility organization type;
- collecting data corresponding to one or more of the variables for selected supply chain facilities in the plurality of supply chain facilities;
- performing performance analysis for the selected supply chain facilities using the data as input, the performance analysis including executing a data envelope analysis (DEA) based three-stage performance analysis model, executing a statistical analysis and executing a sensitivity analysis;
- outputting the results of the performance analysis, the results including a performance ranking of the selected supply chain facilities, the prescriptions for performance improvement, and results of the correlation analysis, and the sensitivity analysis;
- wherein executing the data envelope analysis (DEA) based three-stage performance analysis model comprises:
- performing a first stage DEA analysis on only the data that is attributable to discretionary variables and deriving efficiency scores resulting from the first stage DEA analysis;
- performing a second stage linear programming optimization and discovering any excesses and shortages that provide prescriptions for performance improvement based on the second stage linear programming optimization; and
- regressing the data attributable to non-discretionary variables onto the efficiency scores and distinguishing inefficiencies attributable to the discretionary variables from inefficiencies attributable to the non-discretionary variables.

18. The computer program product of claim 17 wherein supply chain facility organization types include:
- suppliers;
- cross-docks;
- manufacturing plants;
- distribution centers; and
- dealers.

19. The computer program product of claim 17 wherein the selected supply chain facilities are characterized by the same supply chain facility organization type.

20. The computer program product of claim 17 wherein the identifying includes validating the model to be used in the performance analysis.

21. The computer program product of claim 17, wherein the variables are classified by the discretionary variables and the non-discretionary variables, the discretionary variables specifying data that is affected by operational decisions of a corresponding supply chain facility, and the non-discretionary variables specifying data that is not affected by operational decisions made by a corresponding supply chain facility.

* * * * *